July 19, 1955  E. P. COLEMAN  2,713,504
FLUID TIGHT JOINTS

Filed Nov. 29, 1954  2 Sheets-Sheet 1

INVENTOR
Edgar Padbury Coleman
BY G. E. O'Dell
ATTORNEY

INVENTOR
Edgar Padbury Coleman
BY a. s. O'dell
ATTORNEY

United States Patent Office 2,713,504
Patented July 19, 1955

2,713,504

FLUID TIGHT JOINTS

Edgar Padbury Coleman, Hanwell, London, England

Application November 29, 1954, Serial No. 471,621

20 Claims. (Cl. 286—11)

A known method of making a fluid tight joint between two relative rotating parts, such as a shaft and the casing in which it is mounted, is to provide accurately machined surfaces on the two parts which are figures of revolution about an axis which should coincide with the axis of rotation and to press these surfaces firmly into contact. Such surfaces can make a fluid tight joint with small friction and small wear. It is convenient to machine the rubbing surfaces, not upon the relatively rotating parts themselves, but on separate members which can be attached to the parts. But because it is difficult to ensure that the axis of rotation shall be and remain coincident with the axis of the rubbing surfaces, and difficult also to provide, and maintain irrespective of wear, the requisite pressure between the surfaces by exact positioning of the two parts in the axial direction, it is better that one of the members should be free of the part to which it belongs to the extent that it can rock to bring the axis of its machined surface into alignment with the axis of the surface upon which it abuts, and that it can move axially under suitable spring pressure. With such freedom the member can adapt itself both angularly and axially to its fellow so that their machined surfaces lie in contact throughout a complete circle. The gap between the free member and the part to which it belongs necessary to allow this freedom can be closed by a flexible seal, for example by a diaphragm; and this flexible seal may be relieved of the torque arising from the friction between the machined surfaces by providing a positive holding or driving connection between the free member and the part to which it belongs, for instance, in the form of a radial round peg on the one engaging in a slot in the other.

But in course of time the peg will wear a groove in the side of the slot in which it engages and then the free member will no longer be able freely to move in the axial direction.

It is therefore better to make independent provision for freedom of angular adaptation and freedom of axial adaptation, in other words to make the holding or driving connection in two parts one of which takes care of angular adaptation and the other of axial adaptation.

To this end according to this invention the free member is held or driven by the part with which it makes a flexible joint through an elongated key sliding axially in a keyway in the one and a radial driver making a universal pivotal connection between the key and the other.

The key is parallel sided and fits the keyway, and is pivotally associated with the unkeywayed element by a radial pivot; such pivot may be integral with the key and project from it, or a pin associated with the element may project into a bore in the key. The key is made of less thickness than the depth of the keyway or spherical or rounded longitudinally on its upper surface to allow for relative rocking of the two members on an axis at right angles to the pivot and to the keyway.

The preferred arrangement consists however in making the key when mounted fit the keyway both in width and depth, the key being coupled to the unkeywayed element by a recess in the keyway seating on a spherical support associated in fixed position with the unkeywayed element; the spherical support may be the end of a projecting pin, but preferably it is a ball seated in a recess associated with the unkeywayed member. The recess in the key, and if a ball is used also that associated with the unkeywayed element must be of such form and depth as to ensure a driving coupling while permitting angular adaptation within the required limits. The recess in one of the elements may take the form of a deep cylindrical pocket the ball being backed by a spring sufficient to prevent its disengagement from the recess in the other element.

In all cases, there must be some provision for relatively centering the two elements without preventing their relatively angular or longitudinal adaptation.

The keyway can be made of any desired length according to the amount of longitudinal adaptation required, any other parts which might limit this adaptation being correspondingly constructed.

There may be only one key or there may be several say two or three, preferably equally distributed round the circle. If only one key is provided, the free member and the part to which it is keyed must be provided with additional means for centering one in relation to the other with sufficient freedom to allow for angular adaptation and additional centering means may be provided even if there are two equally spaced or more keys. Such centering means must allow the necessary longitudinal adaptation.

For example a row of balls may be used, one of the members having a cylindrical running surface for the balls to permit the longitudinal adaptation and the other a groove to guide the balls.

Arrangements must be made to avoid the balls escaping or producing shocks by crossing the keyway; conveniently the groove may be in the keywayed member and so if deeper than the keyway will prevent escape or shocks. Instead or in addition the grooves may be so located that the key itself prevents the balls from entering the keyway. The groove may be filled with balls, or balls separated by a cage can be used. As an alternative to a row of balls one member may have a rib of rounded section to form an axially arcuate bearing surface adapted to contact with a cylindrical surface on the other member. In either case sufficient running clearance must be provided to allow angular adaptation within the required limits.

The cylindrical surface can be on either the free member or the part to which it is keyed, but since it requires to be truly finished it is conveniently on the inner element in which case it is an external surface. The free member may be associated with the casing or the like but is usually more conveniently associated with the shaft.

In the case of a key seated on a ball, the recesses for the ball may be of part spherical form to fit the ball. They must be at least a little less than a hemisphere, but by making them as deep as the angular adaptation requirements permit, the loading is reduced; by bevelling the key on its recessed side the recesses can be made deep yet a high range of angular adaptation be provided but in practice a very small degree of angular adaptation usually suffices.

The invention will be further described with reference to the accompanying drawings which illustrate examples of preferred constructions embodying the invention.

In the drawings like parts bear the same references.

Figure 1:
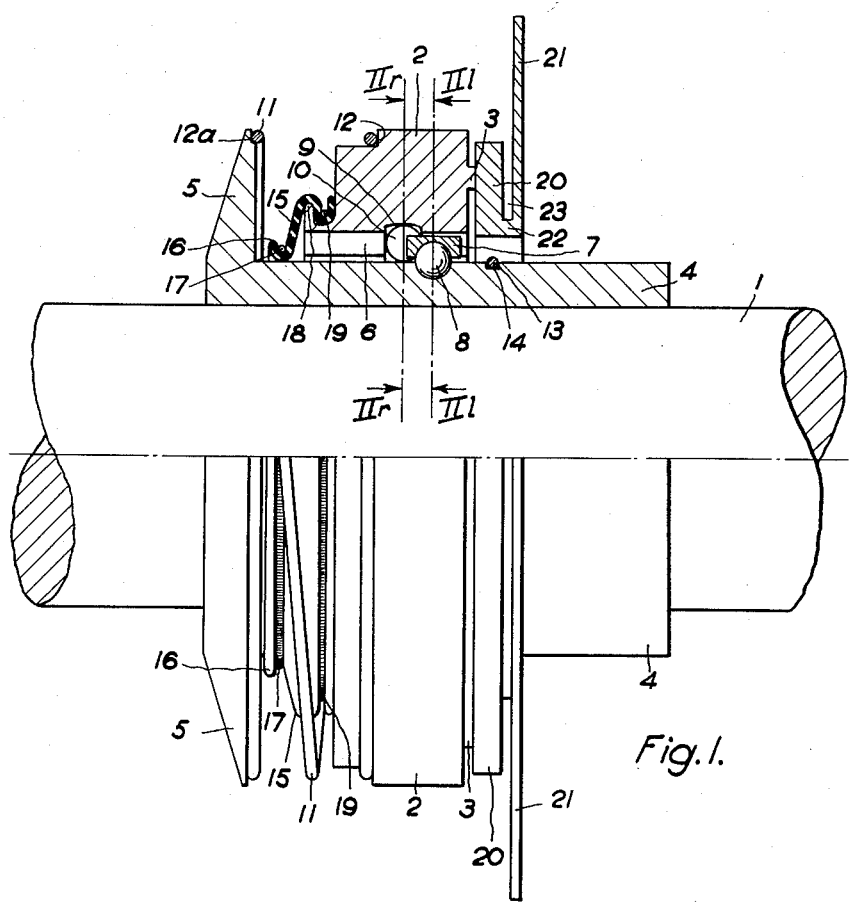
Figure 1 is a side view, half in axial section.
Figure 2:
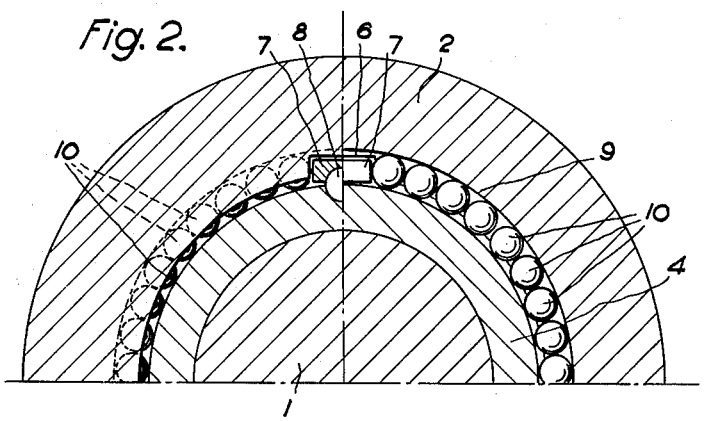
Figure 2 is a cross section, the left hand side being on the line II*l*—II*l* and the right side on the line II*r*—II*r* of Figure 1, of a first embodiment of the invention.

In the embodiment illustrated in Figures 1 and 2 the rotating shaft 1 carries an annular element such as a loose collar member 2 having an integral rib 3 bearing the actual rubbing surface of the joint to be made by the device. The member 2 might be keyed in accordance with the invention to the shaft 1 itself, but it is usually convenient to key it on a separate member so that the device can be more conveniently mounted.

In the example shown there is a separate member in the form of a sleeve 4 mounted fluid tight and in driving engagement on the shaft 1 to which it is if necessary keyed by means not shown, and having integral with it a flange 5.

The collar member 2 is keyed to the sleeve 4 (and thus to the shaft 1) through a keyway 6 and a key 7 which is coupled to the sleeve 4 by a steel ball 8 fitting in a part spherical seating in the key and a part spherical seating in the sleeve; the seatings are of such depth that the key and sleeve cannot be uncoupled even if the clearance between the back of the key and bottom of the keyway is taken up. In fact the key is a good sliding fit in the keyway and the clearance at the back and on the sides of the key is shown exaggerated in the drawings.

Only one key coupling is shown in the drawing but it will be understood that several, preferably equally distributed may be used.

It will be clear that the key coupling will allow the collar member 2 to tilt and slide in relation to the sleeve 4 and that this is so even if there are several key couplings. To centre the collar member 2 in relation to the sleeve, in the illustrated example, the collar is grooved at 9 and constitutes a guide for a row of steel balls 10 which co-act with the cylindrical surface of the sleeve 4 so that they do not restrict relative longitudinal movement; they must have sufficient clearance to allow the required range of angular adaptation. As shown the groove 9 is full except for the part extending across the keyway 6 where the key 7 itself keeps the balls out. Instead balls spaced by a cage might be used, the keyway and key extending across the cage. Again any other equivalent centering means might be used in particular a simple rib of rounded section on the one member say the collar member, coacting with a cylindrical surface on the other member. In the case of a row of balls, the two members should be hardened and hardening will or may also be employed with other centering means where such means requires or allows.

The collar member 2 is pressed longitudinally in relation to the sleeve by the aid of spring means engaging between flange 5 and the collar member 2. The spring means is here shown as a single, helical spring 11, centred by a shoulder 12 in the collar member 2 and a shoulder 12*a* in the flange 5. Instead of a single helical spring, a series of small diameter helical springs may be carried symmetrically, preferably evenly, spaced in bores in the back of the collar member 2, and a groove in its exterior surface may just cut into these bores so that a wire ring lodged in the groove will catch in the springs and prevent them from coming out before the device is fully assembled. The sleeve will be fixed to the shaft at a position in which the desired pressure is obtained and it will be understood that this will not vary perceptibly under such wear as the rubbing surfaces may sustain during the life of the device.

Where the collar member 2 is coupled to the shaft 1 itself, it will be understood that a separate flange such as 5 will be provided as an abutment for the spring means.

A separate flange may also be used in conjunction with a sleeve 4, in which case the flange may be adjustably mounted to enable the spring pressure to be adjusted without moving the sleeve, but the integral arrangement is generally more convenient as it allows the collar, sleeve, centering means and spring to be assembled as a unit ready to be put on the shaft.

To avoid the parts coming adrift before the whole has been assembled in the machine or the like in which the device is used, a spring ring, circlip or the like 13 may be provided lodged in a groove 14 in the sleeve 4, which checks outward movement of the collar member 2 under the pressure of the spring, when the balls 10 reach the circlip. In this position the key 7 will still engage between the balls 10.

The flexible joint is made in the illustrated example by a rubber cuff 15 having one end 16 encircling the sleeve 4 and held firmly to it by a spring ring 17, and having the other end sprung over a rib 18 on the collar 2; a spring ring 19 may also be used at this end. Such a cuff will itself allow a larger longitudinal movement than would ever be required by mere wear, but if a larger movement is required, for example movement of the sleeve 4 in relation to the collar 2 effected to adjust the spring pressure, the end encircling the sleeve can slide or be slid along it.

Any other form of flexible joint which will allow the required adaptation may be used. Thus it might be constituted by e. g. a flexible diaphragm of thin metal or of rubber or like material, sealed to the one member, say the outer, e. g. by a clamping washer, and sealed to the other, e. g. by a skirt which wipes over or grips it, if necessary by the aid of a spring ring or the like encircling it similar to the end 16 and ring 17; or there may be a bellows of rubber or the like secured at both ends e. g. by a sprung on ring or a gripping skirt, in both cases with the aid if necessary of a spring ring or the like encircling it; there is no relative rotation so that a good seal is easily obtained, even if longitudinal adaptation requires one end of the joint member to slide.

The drawing also indicates the abutment of the rubbing joint at 20 and a flange 21 by which the abutment is secured in fluid tight fashion to the casing of the machine. The actual joint here is usually intended to be permanent or at any rate only to be disturbed at long intervals and there is no relative movement so that there is no difficulty in making a good joint by clamping, bolting or other like means, a gasket being interposed if necessary to prevent the bolting or clamping up of the flange 21 to the casing from disturbing the truth of the rubbing surface of the abutment 20. The flange itself is made thin so as to have a little flexibility and the abutment 20 is connected to the flange 21 by a thin section 22. As shown this is formed by an external groove 23; instead it may be formed by an internal groove or both internal and external grooves.

Figure 3:
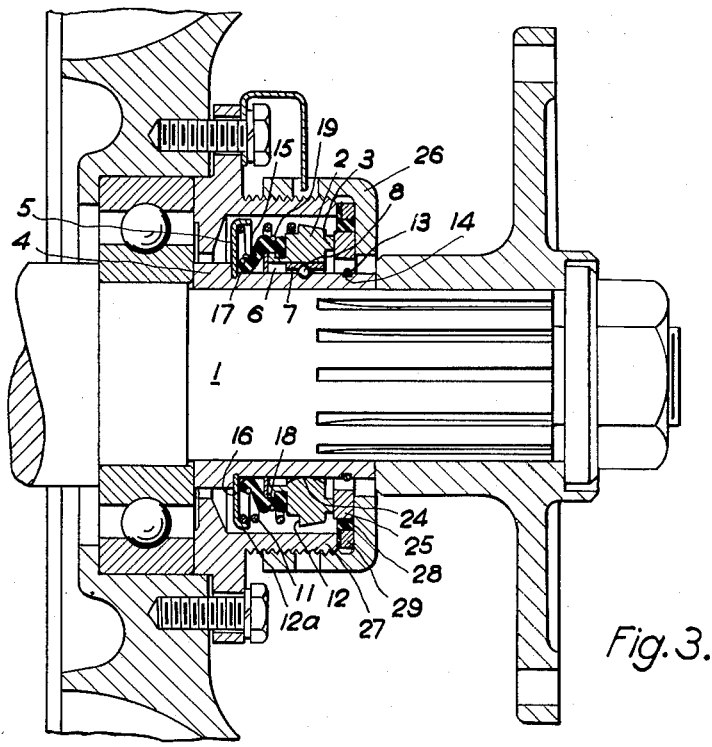
Figure 3 is a side view in axial section of a second embodiment of the invention.

In the embodiment of the invention illustrated in Figure 3 of the drawings the axial centering of the free member 2 is maintaind by means of an axially arcuate bearing surface 24 contacting the cylindrical surface of the sleeve 4. By this means the member 2 is centered whilst permitting rocking and axial movement thereof without the use of the bearing balls 10 accommodated in groove 9 of the embodiment illustrated in Figures 1 and 2.

The highly finished rubbing surface to co-operate with the surface upon projection 3 is formed upon that side of an annular ring 25 facing away from a fast member 26 screwed on to the casing 27. The annular ring 25 is bonded by means of a resilient fluid-proof bonding 28 to a second annular ring 29. The bonding 28 extends over the face of the ring 29 and serves as a sealing ring for the joint between the fast member 26 and the casing 27. By this means the annular ring 25 is mounted coaxially with the fast member 26 and a slight resilience is maintained between these members so that the making fast or other movement or adjustment of the fast member will not disturb or distort the rubbing surface associated therewith.

Figure 4:
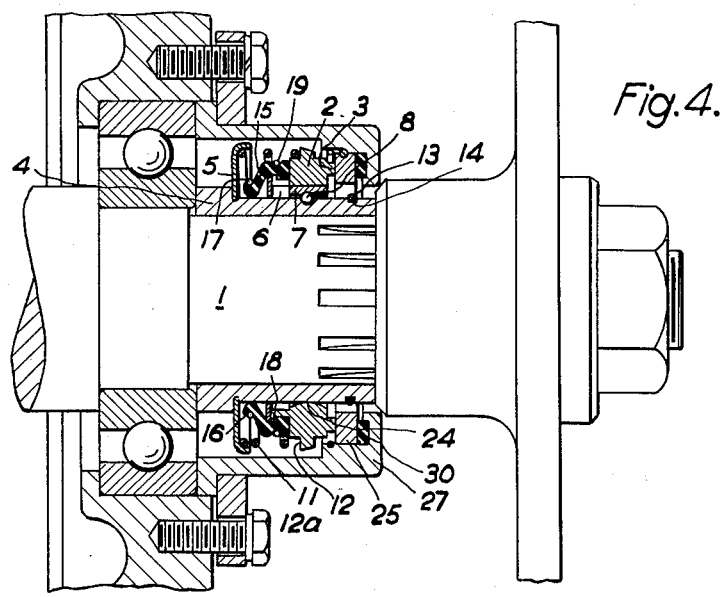
Figure 4 is a side view in axial section of a third embodiment of the invention.

Figure 4 illustrates a variation of the construction of Figure 3 where a detachable fast member is not provided but the casing 27 is extended to provide an annular flange about the shaft 1. The rubbing surface is formed upon an annular ring 25 which makes joint with the casing by means of a jointing ring 30. This may take the form of a resilient fluid proof bonding between the casing and the ring or may be a resilient annular ring bonded to the ring 25 and only mechanically engaging the casing 27. Alternatively an independent resilient jointing ring may be used bonded to neither the ring nor the casing but forming a fluid tight joint and supporting the ring 25 with a slight degree of float by virtue of its resilience.

The material of the bearing surfaces of the sleeve or collar and abutment or annular ring will be chosen to suit the fluid. Thus both may be of hardened steel, or one, generally the collar, of steel and the other of non-ferrous alloy such as bronze or even of a so-called plastic such as phenol-formaldehyde resin. Provision may be made to lubricate their rubbing surfaces. Usually the rubbing surfaces will be plane since such give satisfactory results and can conveniently be finished by lapping, but other forms such as a spherical annulus may be used.

Usually the casing will be stationary and the shaft rotating but the device can be used for the case in which the shaft is stationary and the casing or the like rotates.

It will also be understood that though the examples above are complete independently of the apparatus in which it is used the invention can be incorporated in the actual structure of the apparatus, thus for example the abutment 20 might be integral with the casing of the apparatus in which the invention is used.

What I claim is:

1. A construction of seal for making a fluid-tight joint between two relatively rotating parts, namely a shaft and a casing or the like, comprising a first, fast member and a second, free member, accurately finished surfaces one on each of said members making rubbing contact with one another in a circle around the axis of the shaft, means resiliently urging said surfaces together, means making a fluid tight and fast connection between one of said members and one of said parts, means including a flexible joint making a fluid tight connection between said free member and the other of said parts, and means keying said free member to said other part, said flexible joint and said keying means leaving said free member free to rock and move axially with respect to said other part, said keying means including an elongated key sliding axially in a keyway in one of the two components, namely said free member and said other part, and a radial driver making a universal pivotal connection between said key and the other of said two components.

2. A construction of seal as set forth in claim 1 in which the universal pivotal connection is constituted by a spherical end on the driver fitting a corresponding recess in one of the two elements it connects, namely the key and the other of said components.

3. A construction of seal as set forth in claim 1, in which the driver is a ball lodged in a recess in one of the two elements it connects, namely the key and the other of said components, and fitting a spherical recess in the other of the two elements.

4. A construction of seal as set forth in claim 1 in which the driver is a ball fitting in spherical recesses in the two elements which it connects, namely the key and the other of said components.

5. A construction of seal as set forth in claim 1 also comprising centering means for said free member, said centering means comprising a cylindrical surface on one of the said two components and a ring of balls lying in a groove in the other of said two components and also running against said cylindrical surface.

6. A construction of seal as set forth in claim 5 wherein said groove and said keyway are in the same component and the groove is deeper than the keyway.

7. A construction of seal as set forth in claim 5 wherein said cylindrical surface is on the inner of said two components.

8. A construction of seal as set forth in claim 1, also comprising centering means for said free member, said centering means comprising a cylindrical surface on one of said two components and an axially arcuate bearing surface formed in the other of said two components to run against said cylindrical surface.

9. A construction of seal as set forth in claim 8, wherein said cylindrical surface is on the inner of said two components.

10. A construction of seal as set forth in claim 1 in which the free member is keyed to the shaft.

11. A construction of seal as set forth in claim 10 also comprising a sleeve in fluid tight connection with the shaft, said flexible joint and said keying means connecting and keying said free member to said sleeve.

12. A construction of seal as set forth in claim 11 also comprising a flange integral with said sleeve, the means urging said surfaces resiliently together comprising spring means abutting between said flange and said free member.

13. A construction of seal as set forth in claim 12 wherein said spring means is a single helical spring.

14. A construction of seal as set forth in claim 1 also comprising a sleeve in fluid tight connection with the shaft, said flexible joint and said keying means connecting and keying said free member to said sleeve, a ring of balls between and contacting said free member, and said sleeve whereby the free member is centered without preventing rocking or axial movement of the free member relative to the sleeve, and means for retaining the balls in place without interfering with the normal operation of the seal.

15. A construction of seal as set forth in claim 1, also comprising a sleeve in fluid tight connection with the shaft, said flexible joint and said keying means connecting and keying said free member to said sleeve, said free member being formed with an axially arcuate bearing surface contacting said sleeve whereby said free member is centered without preventing rocking or axial movement of the free member relative to the sleeve.

16. A construction of seal as set forth in claim 1 in which said fast member includes a portion of thin section whereby it is made fast to said part so that slight distortion occasioned by the making fast of said portion will not disturb the rubbing face of said fast member.

17. A construction of seal as set forth in claim 1, in which said rubbing surface associated with said fast member is formed upon an annular ring the construction also including resilient sealing means joining said ring to said fast member whereby slight distortion occasioned by the making fast of said fast member will not disturb the rubbing surface associated therewith.

18. A construction of sealing ring as set forth in claim 17, wherein said resilient sealing means also provides a sealing joint between said fast member and a casing to which said fast member is secured.

19. A construction of seal for making a fluid tight joint between a shaft and a casing or the like, comprising a sleeve adapted to be secured fluid tight on and in driving connection with the shaft, an annular fast member consisting of a thin flange adapted to be made fast in fluid tight fashion to the casing or the like around the shaft and sleeve, a highly finished rubbing surface on said fast member forming a circle round the shaft and facing away from said thin flange, a free member surrounding and clear of said sleeve, a high finished rubbing surface on said free member facing and adapted to rub against the rubbing surface of the fast member, a flexible joint making a fluid tight connection between said free member and said sleeve, an abutment flange integral with said sleeve on the end remote from said fast member, a spring abutting between said abutment flange and said free member thereby urging said rubbing surfaces into contact, a ring of balls between said free member and said sleeve running in a groove in said free member and on the surface of said sleeve thereby centering said free member while leaving it free to rock and move axially, an elongated key slidable axially in a keyway in said free member, and a ball constituting a driver engaged in a spherical recess in said key and a spherical recess in said sleeve thereby providing a driving connection between the sleeve and the free member while leaving the free member free to rock and move axially.

20. A construction of seal for making a fluid tight joint between a shaft and a casing or the like, comprising a sleeve to be secured fluid tight on and in driving connection with the shaft, an annular fast member to be made fast in fluid tight fashion to the casing or the like about the shaft and sleeve, a highly finished rubbing surface upon an annular ring, resilient sealing means joining said ring co-axially to said fast member with the rubbing surface of said ring facing away from said fast member, a free member surrounding and clear of said sleeve, a highly finished rubbing surface on said free member facing and adapted to rub against the rubbing surface associated with said fast member, a flexible joint making a fluid tight connection between said free member and said sleeve, an abutment flange integral with said sleeve on the end thereof remote from said fast member, a spring abutting between said abutment flange and said free member to urge said rubbing surfaces into contact, an axially arcuate bearing surface formed upon said free member contacting said sleeve and thereby centering said free member whilst leaving it free to rock and move axially, an elongated key slidable axially in a keyway in said free member, and a ball constituting a driver engaged in spherical recesses in said key and said sleeve thereby to provide a driving connection between the sleeve and the free member whilst leaving the free member free to rock and move axially.

No references cited.